H. McCown,
Lock Nut.
No. 87,953.  Patented Mar. 10, 1869.
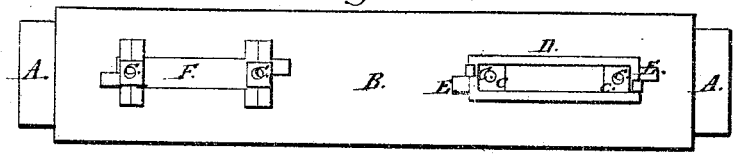
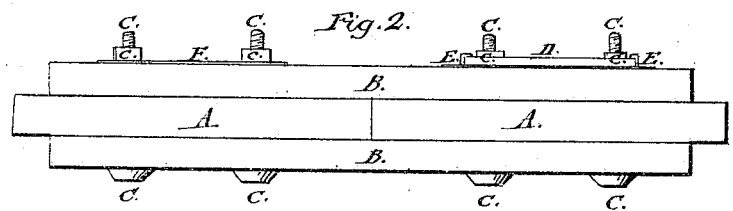
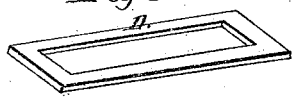
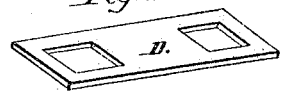
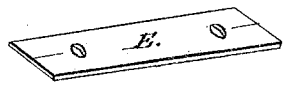
Witnesses:
Jesse Zepp
C. H. Bishop
Inventor:
Harvey McCown
by Prindle & Dyer atty.

HARVEY McCOWN, OF ENON VALLEY, PENNSYLVANIA.

*Letters Patent No. 87,953, dated March 16, 1869.*

IMPROVEMENT IN DEVICE FOR LOCKING NUTS.

The Schedule referred to in these Letters Patent and making part of the same.

*To all whom it may concern:*

Be it known that I, HARVEY McCOWN, of Enon Valley, in the county of Lawrence, and in the State of Pennsylvania, have invented an Improved Apparatus for Locking Nuts upon Bolts; and do hereby declare that the following is a full, clear, and exact description thereof, reference being had to the accompanying drawing, making a part of this specification, in which—

Figure 1 is a side elevation of a "fish-joint" for clamping the ends of railroad-iron, with the nuts secured by my improved lock;

Figure 2 is an edge view of the same;

Figures 3 and 4 represent two forms of locks; and

Figures 5 and 6, two forms of washers.

Letters of like name and kind refer to like parts in each of the accompanying figures.

My invention relates to a class of devices used for preventing nuts from working loose upon their bolts; and It consists of the peculiar construction and use of the washers, by means of which the lock-clamp is held in place and the nut securely fastened.

In the annexed drawing—

A A represent the ends of two rails, and B B, two clamps forming the fish-joint, which are placed upon opposite sides of said rails, and the whole firmly secured together by means of four bolts, C C, &c., passing through said clamps and rails, and each provided with a nut, c, upon its end.

D represents a clamp, or lock, in which two openings are provided, corresponding in size and shape to the nuts, and at a proper distance apart to permit said clamp to be placed over said nuts, when the latter are so arranged as that their edges are at a right angle to or parallel with a line passing from the centre of one bolt to that of the other, by which means the nuts are prevented from turning while said clamp is in place.

To accomplish the latter result, a washer, E, formed of a thin strip of sheet-metal, is placed beneath the nuts, and its ends bent over the clamp, as shown in fig. 1.

As but a slight force is required to hold the clamp in place, if the ends of the washer are slitted one or more times, so as to allow a portion of its width to be bent up, said clamp may be removed and replaced a number of times before the washer is destroyed.

The clamp may be constructed with two square openings, or with one long opening, as shown in figs. 3 and 4.

In fig. 5 is shown a form of washer designed for use without the lock-clamp. This washer, F, is similar in size and shape to that before described, except that it has two arms, *f f*, projecting from opposite sides, near each end, giving to each the form of a cross.

The body of the washer, as well as the arms, corresponds in width to the size of the nut, and each is divided, or slitted lengthwise from the end, to within a short distance of the hole through which the bolt passes, so as to permit one-half of either of said ends to be bent upward against the side of the nut.

It will be evident that if the whole of one of the ends were bent upward against the nut, but one-half would be of use in holding said nut; as, in unscrewing, that portion of the side of said nut in the rear of the corners would leave the lock, while the portion in front of said corners would press more and more against it. It therefore becomes necessary to bend up but one-half of one of the ends, in order to secure, or lock the nut, and this operation may be performed three or more times, or until one-half of each end has been used and broken off, when, by turning the washer, so as to bring its under side upward, an equal amount of use may be had.

Although my invention is shown as applied to the joint between two bars of railroad-iron, it will be readily seen that it is equally applicable to nuts wherever used, and that it will entirely obviate the necessity for using jam, or lock-nuts, which are not only more expensive, but also less reliable.

It is believed that these devices possess many advantages, among which are perfect security against derangement of the articles secured together by bolts, from the loosening of the nuts, together with cheapness, durability, and convenience in their use.

Having thus fully set forth the nature and merits of my invention,

What I claim as new, and desire to secure by Letters Patent, is—

The washer E, in combination with the lock-clamp D, substantially as and for the purpose shown.

Also, the washer F, constructed in the form of a double cross, with each of its ends slitted, or divided, substantially as shown and for the purpose set forth.

In testimony that I claim the foregoing, I have hereunto set my hand, this 5th day of February, 1869.

HARVEY McCOWN.

Witnesses:
JAMES M. ANDERSON,
MAGGIE ANDERSON.